UNITED STATES PATENT OFFICE.

NANDOR KOLÁR AND WILHELM JANCSÓ, OF BUDAPEST, AUSTRIA-HUNGARY.

PROCESS FOR PRESERVING WOODEN ARTICLES BURIED IN THE EARTH.

1,042,564.  Specification of Letters Patent.  Patented Oct. 29, 1912.

No Drawing.  Application filed December 26, 1911. Serial No. 667,802.

*To all whom it may concern:*

Be it known that we, NANDOR KOLÁR and WILHELM JANCSÓ, subjects of the King of Hungary, both residing at Budapest, in the Empire of Austria-Hungary, have invented a new and useful Improvement in Processes for Preserving Wooden Articles Buried in the Earth; and we do hereby declare the following to be a full, clear, and exact description of the same.

The present invention relates to a process for preserving wood buried in the earth, especially telegraph poles. Attempts were formerly made to preserve them either by impregnation of the wood or by the application of protective coats or covering. But both processes have their disadvantages. The impregnation can only be effected in impregnating plant arranged for that purpose so that the transporting charges increase the expense of the process, high in itself, while the various protective coats proposed are soon attacked by the earth's dampness and rendered pervious to water, and besides, even with the care in carrying out the process, splits in the wood soon appear through which the destructive living organisms are allowed free access to the wood. The manufacture of special protective envelops requires, first of all, skilled workmen and very careful work; and moreover protective envelops do not, when thin, afford the desired protection for any length of time, and when made thick the cost of manufacture increases so considerably that their employment can only be considered under determined conditions. Finally protective coverings tightly inclosing the pole do not allow of occasional examination of that part of the wood under the protective covering. All these disadvantages are avoided by the new process forming the subject matter of the invention.

In contrast to former processes the wood is not protected against the harmful micro-organisms swarming in the earth, but the earth itself around the wood is made unsuitable for the flourishing of such harmful organisms. There is a very important advance there for the process can be employed without disturbing the pole, even with poles already in use, and can be carried out on the spot by entirely unskilled help with special appliances. Since the earth can be mixed thoroughly with the protective material, there is effected an entirely uniform impregnation of all the saturated layers of earth, whereas saturation of the wood throughout its mass is practically impossible. Moreover a protective envelop on the pole can only be made of a thickness of some millimeters, while the impregnating of the soil can be effected for layers at least 200 mm. thick. Hence it is impossible that through a layer of earth 200 mm. thick saturated with waterproof protective material any injurious influence could reach the wood from the surrounding earth. Finally the protected portions of the pole can always be examined as to condition while the saturated earth is removed from around the pole as deep as desired and after examination is replaced, or by means of a suitable tool some small splinters can be taken from the surface of the wood at the desired depth without disturbing the earth around the pole.

The essence of the new invention consists in this that the earth layers surrounding the buried portions of the wood are saturated with waterproof preservative means, that is with such means as are not, within the desired period, washed away noticeably by rain or ground water, for instance crude petroleum, wood, oil, and coal tar, or the distillation products of petroleum.

The process is carried out, for instance, in the following manner: The earth surrounding the wooden object is removed to a thickness of about 200 mm. and to a depth of about 700 mm. and is saturated with the preservative, for instance crude oil, whereby the destructive organisms and their spawn are destroyed and the earth is unsuitable for the development of parasites. The earth thus immunized is replaced around the wooden object and tamped down. This process is repeated at intervals of from 1 to 3 years. For the purpose of increasing the thickness of the saturated earth layers surrounding the wooden object circular or segmental forms can be made of the saturated earth and the wood to be protected surrounded with them, and under certain circumstances these forms can be again saturated with the preservative liquid after having been put in place. Finally, the process can be so carried out that if the earth found on the spot is unsuitable for saturation, due to the dampness, dry clay, sand or gravel may be mixed with the preservative instead of the earth taken out, tamped in around the wooden object or the wooden object may be surrounded with forms made of this mass.

We claim as our invention:

1. A method for preserving timber buried in the earth, consisting in mixing or impregnating the layer of earth adjoining the portions of the wooden articles in the earth, with a preservative which cannot be washed away by water.

2. A method for preserving timber buried in the earth, consisting in mixing or impregnating the layer of earth adjoining the portions of the wooden articles in the earth to a depth of substantially 700 mm. and to a minimum thickness of substantially 200 mm. with a preservative which cannot be washed away by water.

3. A method for preserving timber buried in the earth, consisting in removing the earth surrounding the timber, mixing or impregnating said removed earth with a preservative substantially insoluble in water and replacing the impregnated earth around the timber.

4. A method for preserving timber buried in the earth, consisting in removing the earth to a depth of substantially 700 mm. and to a minimum thickness of substantially 200 mm. surrounding the timber, mixing or impregnating said removed earth with a preservative substantially insoluble in water and filling back the impregnated earth around the timber In testimony whereof, we have signed our names to this specification in the presence of two subscribing witnesses.

NANDOR KOLÁR,
WILHELM JANCSÓ.

Witnesses:
  HENRY HASPER,
  WOLDEMAR HAUPT.